United States Patent [19]

Osman

[11] Patent Number: 4,545,976

[45] Date of Patent: Oct. 8, 1985

[54] HYDROCARBON STEAM REFORMING USING SERIES STEAM SUPERHEATERS

[75] Inventor: Robert M. Osman, Parsippany, N.J.

[73] Assignee: Exxon Research & Engineering Co., Florham Park, N.J.

[21] Appl. No.: 550,552

[22] Filed: Nov. 10, 1983

[51] Int. Cl.$^4$ .......................... C01B 3/24; C07C 1/02
[52] U.S. Cl. .................... 423/650; 252/373
[58] Field of Search ............ 423/650, 651, 652; 252/376, 373

[56] References Cited

U.S. PATENT DOCUMENTS

| | | | |
|---|---|---|---|
| 2,788,265 | 4/1957 | Bowers | 252/376 X |
| 3,441,393 | 4/1969 | Finneran et al. | 48/197 |
| 3,442,613 | 5/1969 | Grotz, Jr. | 23/199 |
| 3,598,527 | 8/1971 | Quartulli et al. | 423/651 X |
| 3,947,551 | 3/1976 | Parrish | 423/359 |
| 4,162,290 | 7/1979 | Crawford et al. | 252/373 X |
| 4,213,954 | 7/1980 | Pinto | 423/359 |
| 4,264,567 | 4/1981 | Pinto | 423/359 |
| 4,296,085 | 10/1981 | Banquy | 252/373 X |
| 4,337,170 | 6/1982 | Fuderer | 252/373 |
| 4,367,206 | 1/1983 | Pinto | 423/359 |
| 4,442,020 | 4/1984 | Fuderer | 252/373 |

FOREIGN PATENT DOCUMENTS 2828001 2/1979 Fed. Rep. of Germany ...... 423/650

OTHER PUBLICATIONS

Kirk-Othmer, *Encyclopedia of Chemical Technology*, 3d Editions, vol. 2, pp. 492-494 (1978).
H. W. Graeve, "High Pressure Steam Equipment for a Low Energy Ammonia Plant," *CEP*, pp. 54-58 (Oct. 1981).
J. G. Livingstone & A. Pinto, "New Ammonia Process Reduces Costs," *AIChE Ammonia Safety Symposium Proceedings*, Paper 123f (Nov. 14-18, 1982, Los Angeles, California).
Frank C. Brown, "Ammonia Plants New or Make New, "*Humphreys & Glasgow Limited* brochure (undated) (17 pages).
F. C. Brown, "Ammonia Plant Preferences in the 1980's," *The Fertiliser Society*, a paper which is indicated to have been read before The Fertiliser Society of London on Oct. 19, 1983 (16 pp.).
J. G. Livingstone and A. Pinto, "Solve Ammonia Plant Problems with the AMV Process," a paper which is indicated to have been presented at Fertiliser '83 International Conference, London, England, Nov. 13-16, 1983.

*Primary Examiner*—Donald R. Valentine
*Attorney, Agent, or Firm*—Jack B. Murray, Jr.

[57] ABSTRACT

In a process for steam reforming of a hydrocarbon gas feedstream wherein: (a) the hydrocarbon gas feedstream is partially reformed at elevated temperatures in indirect heat exchange with hot combustion gases in a direct fired primary reforming furnace provided with a convection section for recovery of excess heat from said combustion gases; and (b) the partially reformed feedstream is then further reformed in the presence of an oxygen-containing gas and steam in a secondary reformer to form a secondary reformer gaseous effluent; the improvement which comprises recovering waste heat from said secondary reformer effluent gas and from said primary reforming combustion products by (i) heating a high pressure saturated steam in a first steam superheating zone by indirect heat exchange with at least a portion of said secondary reformer effluent gas to form a first superheated steam stream; and (ii) further heating said first superheated steam in a second steam superheating zone by indirect heat exchange with at least a portion of said primary reformer hot combustion gases to form a second superheated steam stream.

14 Claims, 5 Drawing Figures

HYDROCARBON STEAM REFORMING USING SERIES STEAM SUPERHEATERS

CROSS-REFERENCE TO RELATED APPLICATION

This application is related to an application filed on even date herewith, Ser. No. 550,553, entitled "Improved Low Severity Hydrocarbon Steam Reforming Process".

BACKGROUND OF THE INVENTION

1. Field of the Invention

The present invention is directed to an improved process for the steam reforming of hydrocarbon gas feeds, and specifically to a steam reforming process which utilizes series steam superheaters for improved heat integration.

2. Description of the Prior Art

Generally, the manufacture of ammonia consists of preparing an ammonia synthesis gas from a nitrogen source, usually air, and from a hydrogen source, which is conventionally either coal, petroleum fractions, or natural gases. For example, in the preparation of ammonia synthesis gas from a light hydrocarbon feedstock, which may range from natural gas to naphtha, the hydrocarbon feedstock gas is first purified by removing gaseous contaminants, such as sulfur (which would poison the downstream catalysts) from the feedstock by the catalytic hydrogenation of the sulfur compounds to hydrogen sulfide and adsorption of the hydrogen sulfide over a zinc oxide adsorption medium. Subsequent steam reforming of the contaminant-free gas provides the major portion of the hydrogen required for ammonia synthesis from the hydrocarbons in the gas. Reforming is accomplished by a two-stage process in which a mixture of steam and the purified feed gas are first reformed over catalyst in a primary reformer, followed by treatment of the partially reformed gas in a secondary reformer to which air is introduced, in order to provide the required amount of $N_2$ for ammonia synthesis. A reformed gas is produced in the secondary reformer having a greater amount of hydrogen and a lesser amount of hydrocarbons. The reaction processes occurring in the reforming of the feedstock gas begin with the breakdown of hydrocarbons to methane, carbon dioxide and carbon monoxide:

$$H_2O + C_nH(2n+2) \rightarrow CH_4 + CO + CO_2 + H_2$$

and end with the reforming of these products by the desired endothermic methane reforming reaction:

$$CH_4 + H_2O \rightarrow CO + 3H_2$$

and by accompanying exothermic reactions:

$$2CH_4 + 7/2\ O_2 \rightarrow CO_2 + CO + 4H_2O$$
$$CO + H_2O \rightarrow CO_2 + H_2$$
$$2H_2 + O_2 \rightarrow 2H_2O$$
$$CO + \tfrac{1}{2}O_2 \rightarrow CO_2$$

The carbon monoxide in the reformed gas is converted to carbon dioxide and additional hydrogen in one or more shift conversion vessels, and the carbon dioxide is removed by scrubbing. Further treatment of the raw synthesis gas by methanation may be used to remove additional carbon dioxide and carbon monoxide from the hydrogen-rich gas, resulting subsequently in an ammonia synthesis gas containing approximately three parts of hydrogen and one part of nitrogen, that is, the 3:1 stoichiometric ratio of hydrogen to nitrogen in ammonia, plus small amounts of inerts such as methane, argon and helium. The ammonia synthesis gas is then converted to ammonia by passing the gas over a catalytic surface based upon metallic iron (conventionally magnetite) which has been promoted with other metallic oxides, and allowing the ammonia to be synthesized according to the following exothermic reaction:

$$N_2 + 3H_2 \rightarrow 2NH_3$$

Conventional reforming ammonia plant designs recover all of the waste heat available from cooling the secondary reformer effluent (typically at temperatures of from 1600° to 1900° F.) down to a temperature suitable for high temperature shift converter operation (which typically employs an inlet temperature of from 600° to 750° F.) by generation of high pressure saturated steam. Since saturated steam temperatures at pressures within the realm of proven steam turbine technology are no more than about 650° F., this results in a substantial temperature downgrading of the heat available in the secondary reformer effluent, which is undesirable from the standpoint of the second law of thermodynamics. Even more importantly, it represents a severe restriction on steam balance flexibility since the waste heat goes only into saturated steam generation.

In U.S. Pat. No. 3,441,393 to Pullman, a series of two saturated steam generators are employed to recover heat from the secondary reformer effluent.

Various patents to ICI have issued in which the secondary reformer effluent is first employed to generate saturated steam in a first steam generator and is then used to generate superheated steam from steam passed thereto from a steam superheater which in turn has recovered heat from the ammonia synthesis reactor effluent. Finally, additional quantities of saturated steam are generated in a second steam generator from the secondary reformer effluent, before this effluent is passed to the shift conversion.

U.S. Pat. Nos. 4,213,954 and 4,264,567 illustrate these systems. U.S. Pat. No. 4,367,206 to ICI produces methanol and ammonia in a process in which heat is recovered from the effluent of one ammonia synthesis reactor catalyst stage by superheating steam which is then further superheated by indirect heat exchange with secondary reformer effluent. However, such a process is not easily employed in combination with newer ammonia synthesis reactor designs which employ large volumes of conventional catalyst to improve energy efficiency and which optimally operate at lower temperatures, nor with newer ammonia synthesis catalysts which also optimally operate at lower temperatures. Also, the process requires the use of expensive, high pressure shells in said superheat exchanger equipment since, if energy efficient high pressure steam generation is employed, both fluids exchanging heat would have pressures exceeding 1000 psig (1000–2200 psig on the steam side and 1000–6000 psig on the reactor effluent side).

U.S. Pat. No. 3,442,613 to Braun also illustrates a system in which saturated steam is generated by heat recovery from the secondary reformer effluent. Another patent in this vein is U.S. Pat. No. 3,947,551 to Benfield.

SUMMARY OF THE INVENTION

In a process for steam reforming of a hydrocarbon gas feedstream wherein: (a) the hydrocarbon gas feedstream is partially reformed at elevated temperatures in indirect heat exchange with hot combustion gases in a direct fired primary reforming furnace provided with a convection section for recovery of excess heat from said combustion gases; and (b) the partially reformed feedstream is then further reformed in the presence of an oxygen-containing gas and steam in a secondary reformer to form a secondary reformer gaseous effluent; the improvement which comprises recovering waste heat from said secondary reformer effluent gas and from said primary reforming combustion products by (i) heating high pressure saturated steam in a first steam superheating zone by indirect heat exchange with at least a portion of said secondary reformer effluent gas to form a first superheated steam stream; and (ii) further heating said first superheated steam in a second steam superheating zone by indirect heat exchange with at least a portion of said primary reformer hot combustion gases to form a second superheated steam stream.

With the increasing emphasis on development of low energy ammonia plant designs, more and more process waste heat is recovered by way of steam production, while other energy saving features manifest themselves in reductions of steam consumption. These combined effects tend to make a new highly efficient design a net exporter of steam. However, if uses for export steam are limited, either the energy cannot be saved in the first place or the excess steam must be diverted to inefficient electric power turbogeneration. Turbogeneration requires a very high investment, and is particularly unattractive if low cost coal, nuclear or hydroelectric based electricity is available. The current invention minimizes steam production, while maintaining high energy efficiency.

DETAILED DESCRIPTION OF THE INVENTION

Figure 1:
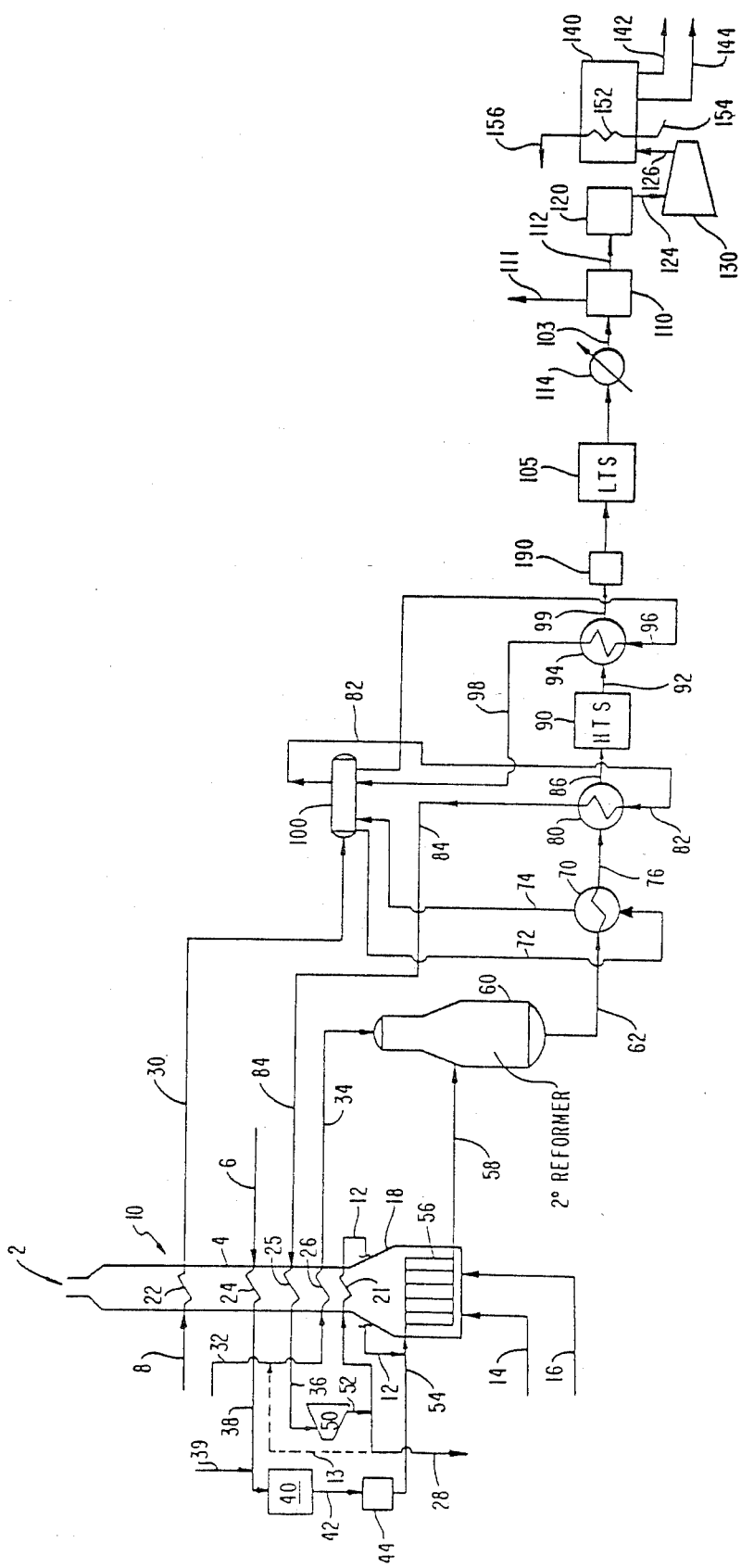
FIG. 1 is a diagrammatic illustration of one embodiment of the process of this invention.

Referring to FIG. 1, there is seen a primary reforming furnace stage generally indicated by the numeral 10, having convection section 4, and primary reforming radiant section 18 heated by burners (not shown, and mounted, for example, in the floor of the radiant section) which are supplied with fuel gas 14 and an oxidant gas (e.g., combustion air) 16 as illustrated. Hot flue gas exiting the radiant section flows through convection section 4, past process steam superheat exchanger 21, process air (which may contain steam and air) heat exchanger 26, power steam superheat exchanger 25, feed gas heat exchanger 24, and boiler feed water preheater 22, and is discharged through stack 2. Therefore, primary reformer 10 is direct fired by means of the combustion of fuel gas 14 and the oxidant gas 16 therein. It will be understood that the direction of flow of the hot combustion gases through primary reformer 10 is not critical, and primary reformer 10 can comprise any conventional primary reformer design, such as is illustrated in U.S. Pat. No. 4,213,954, wherein the combustion gas is passed downwardly from the upper portion of the reformer's radiant section and wherein the convection section is horizontally disposed.

The two-stage reforming process requires the introduction of four separate process streams to the primary reformer: feed gas (for a source of hydrogen), steam, an oxygen-containing gas and fuel gas. In addition, where the process is intended for use in producing an ammonia synthesis gas, a source of nitrogen gas (which is generally air) is added in the secondary reforming stage.

Feed gas is introduced into the process via conduit 6 and passes through feed gas heat exchanger 24, positioned in the primary reforming furnace's convection section 4. This preheats the feed gas to approximately 750° F. The gas feedstocks 6 which can be treated in accordance with the process of this invention can vary widely. Suitable feed gases include coke gas or refinery gases, such as are discussed in U.S. Pat. No. 3,649,558, in addition to coal pyrolysis gas, and feedstocks such as those available from intermediate BTU gas (IBG) streams resulting from the gasification of coal or lignite using conventional gasification processes. Also suitable as feeds are natural gas, naphtha, liquefied petroleum gas (LPG), liquefied natural gas (LNG) and the like.

The heated feed gas is withdrawn from exchanger 24 via conduit 38 and may be admixed with $H_2$ containing gas and the contacted at elevated temperatures with a conventional hydrodesulfurization catalyst such as a supported Co-Mo or Ni-Mo hydrodesulfurization catalyst to convert the S compounds in the feed gas to S forms which can then be removed in sulfur removal zone 44.

Alternatively, or in addition to hydrodesulfurization zone 40, feed gas 38 can be admixed with sufficient steam to supply the water of reaction required for a subsequent COS hydrolysis reaction if COS is present in the feed. The quantity of steam which is thus introduced can vary widely and will generally comprise from about 2 to 4 vol. %, based on the total feed gas in conduit 38 withdrawn from exchanger 24. The COS reaction can be effected by any conventional means, using conventional hydrolysis catalysts such as activated alumina. In this reactor, COS contained in the feed gas is converted into hydrogen sulfide gas at conventional hydrolysis conditions, which typically range from about 300° to 350° F. and from about 300 to 600 psig.

The gas mixture resulting from the hydrodesulfurization treatment (or from a COS hydrolysis step) may contain hydrogen sulfide, and is introduced via conduit 42 into sulfur removal zone 44, generally at a gas temperature of from about 600° to 750° F., and hydrogen sulfide impurities are removed from the gas stream by conventional technology, such as by use of a zinc oxide adsorption bed. The gas, now essentially free of sulfur impurities (e.g., containing less than about 0.2 ppm by weight of sulfur compounds, calculated as elemental sulfur), is withdrawn via conduit 54 and admixed with steam, which can be accomplished by injecting steam into conduit 54 via conduit 12 and which can comprise at least a portion of steam turbine 50 exhaust. Normally, either the turbine exhaust steam 12 is heated before mixing with the desulfurized feedstock gas, or this exhaust steam is first admixed wth the feedstock gas and the resulting mixture is heated, before being passed to the primary reforming step. Again, the quantity of steam introduced at this point can vary, and will generally range from about 2.5 to 5.0 moles per mole of carbon in the desulfurized gas feed. The function of the steam introduced at this point in the process is to provide the water of reaction necessary for the subsequent reforming reactions. The steam/desulfurized gas mixture is then introduced into the tubes 56 of primary reformer 10 wherein the feed gas is at least partially reformed by contacting the feed gas, under reforming conditions, in tubes 56 with a conventional reforming catalyst. Any conventional primary reforming catalyst can be employed, such as nickel, nickel oxide, chromia, molybdenum, mixtures thereof and the like, with nickel-on-calcium aluminate or nickel-on-alumina being preferred. The temperature within tubes 56 will generally range from about 800° to 1500° F. and the pressure will generally range from about 300 to 1000 psig, and the total gas hourly space velocity in tubes 56 will generally range from about 5000 to 15,000 v/v/hr., with a range of from 6000 to 10,000 v/v/hr. being preferred.

As a result of the reforming reactions occurring in tubes 56 of primary reformer 10, substantially all of the hydrocarbon components of the feed gas (other than methane) are converted to $CH_4$, CO, $CO_2$ and $H_2$; a portion of the original methane component is likewise converted to CO, $CO_2$ and $H_2$; and the temperature of the gas mixture will be generally increased to about 1250° to 1500° F. The partially reformed gas will generally have a residual methane level of from about 5 to 20 vol. % $CH_4$, on a dry basis.

The hot combustion gases travel past the exterior of tubes 56 out of radiant section 18 and into convection section 4 wherein the hot gases contact heat exchangers 21, 26, 25, 24, and 22, for recovery of heat by exchange with various streams. The precise number and sequence of the convection section heat exchangers can be chosen using conventional techniques to minimize investment and/or maximize energy recovery. (For example, one or more heat exchangers may be split into separate units in convection section 4 to achieve a more favorable temperature profile.) Boiler feed water 8 is passed through heat exchanger 22 and then via conduit 30 to steam drum 100, from which steam is passed for superheating through exchangers 80 and 25, (as will be described in more detail below), to achieve a steam temperature of approximately 900° F. Additional boiler feed water preheated by other means, can be also passed to steam drum 100, if desired.) This steam is then passed to turbine 50 to generate work, and the resulting steam from turbine exhaust line 52 is partially withdrawn via conduit 28 and the remainder is passed to heat exchanger 21 for reheating of the exhaust steam to about 1200° F. in indirect heat exchange in convection section 4, and thence to conduit 12. The thus reheated steam is combined with the desulfurized feed gas and fed to catalyst-filled reformer tubes 56 in radiant section 18.

Process air obtained from any convenient source is preheated by passing it via conduit 32 to primary reformer convection exchanger 26 wherein it is heated (generally to a temperature of from about 900° to 1300° F.) by indirect heat exchange with the hot primary reformer convection gas. Prior to or at an intermediate point in the heating process, the air may be mixed with a portion of turbine exhaust steam 13. The thus-heated process air (with or without admixed steam) is introduced via conduit 34 into secondary reformer 60, together with the partially reformed gas mixture which is introduced via conduit 58.

The quantity of air introduced via conduit 34 is adjusted using conventional control means (not shown), to provide an air:feed ratio sufficient to yield about a 3:1 hydrogen:nitrogen ratio in the ammonia synthesis gas, that is, to provide a $H_2:N_2$ ratio of from about 2.6:1 to 3.2:1, and preferably from about 2.7:1 to 3.2:1.

Secondary reformer 60 can comprise an adiabatic reformer of conventional design and during steady-state operation achieves further reforming by means of the heat released therein from the exothermic reaction of oxygen with partially reformed feedstock. The amount and type of catalyst in reformer 60 is also conventional, with Ni catalysts supported on alumina being typical. The secondary reformer will generally employ an outlet temperature of from about 1600° to 1900° F., a pressure of from about 300 to 1000 psig, and a total gas hourly space velocity of from about 6000 to 10,000 v/v/hr.

The reformer effluent gas (generally having a temperature of from about 1600° to 1900° F. and a residual $CH_4$ level of from about 0.2 to 2.0 vol. % $CH_4$, on a dry basis) is withdrawn from secondary reformer 60 via conduit 62 and is passed to steam generator 70 in which saturated high pressure steam is generated and withdrawn via conduit 74 from preheated feedwater passed to generator 70 via conduit 72. The thus generated high pressure steam 74 is passed to steam drum 100, which also provides the source of the preheated feedwater 72 (generally preheated to a temperature of from about 450° to 650° F.). The resulting partially cooled secondary reformer effluent (generally at a stream temperature of from about 850° to 1500° F.) is withdrawn via conduit 76 and then passed to steam superheater 80 for superheating of steam which is passed thereto via conduit 82 (generally at a temperature of from about 450° to 650° F., and about 400 to 2200 psig) from steam drum 100, to produce superheated steam. The superheated steam 84 (generally at a temperature of about 500° to 950° F. and about 400 to 2200 psig) is passed to superheat exchanger 25 in the primary reformer convection section 4, for generation of a higher level superheat therein, generally forming superheated steam having a temperature of from about 600° to 1050° F. From superheater 80, the cooled reformer effluent is passed via conduit 86 to high temperature shift (HTS) converter 90, wherein carbon monoxide in the reformer effluent gas is converted over conventional catalysts and using conventional methods and equipment to carbon dioxide and additional hydrogen.

Generally, a temperature of from about 600° to 900° F. and a pressure of from about 300 to 1000 psig will be employed in converter 90, and the catalyst will generally comprise a supported, chromium-promoted iron catalyst. Thereafter, gas exiting the high temperature shift converter is withdrawn via conduit 92 and is passed to a second steam generator 94 in which saturated steam 98 is produced from water feed 96 and is returned to drum 100 from which water 96 was received. The partially cooled high temperature shift effluent from generator 94 (optionally after further heat recovery, as for example in a separate boiler feedwater preheat exchanger) is fed to low temperature shift (LTS) converter 105, or preferably first to guard bed 190.

Guard bed 190, which is optional, is preferably employed to treat gas stream 99 upstream of low temperature shift converter 105 to remove halide and sulfur impurities and thereby protect any halide- and sulfur-sensitive catalyst in low temperature shift converter 105. The operation of guard bed 190 and the type of catalyst used therein (e.g., zinc oxide promoted with copper oxide), is conventional, and this step is generally conducted at temperatures and pressures within the ranges used in low temperature shift converter 105 as described below, and the solids employed in guard bed 190 for such halide- and S-impurities removal can comprise the same catalyst as is used in low temperature shift converter 105.

In shift converter 105, a low temperature shift conversion reaction is effected over conventional catalyst using conventional methods and equipment to form additional quantities of $H_2$ and $CO_2$. Generally, a temperature of from about 400° to 500° F. and a pressure of from about 300 to 1000 psig will be employed in converter 105, and the catalyst will generally comprise a mixture of zinc and copper oxides. The effluent gas from low temperature shift converter 105 is then cooled in heat recovery zone 114 (which can comprise one or more heat exchange vessels), and the cooled, low temperature shift converter effluent gas 103, now depleted of its heat values, is passed to $CO_2$-removal zone 110, in which any conventional process (e.g., solvent absorption of $CO_2$ gas) can be used to remove $CO_2$ via conduit 111. The resulting, substantially $CO_2$-free gas is fed by conduit 112 to conventional methanator zone 120 (which normally includes one or more heat exchangers) for removal of additional CO and $CO_2$ and is then withdrawn (via conduit 124), compressed in compressor 130 and passed as direct feed via conduit 126 to ammonia synthesis and recovery zone 140, wherein $NH_3$ is formed from the $H_2N_2$ synthesis gas 126 (i.e., about 3:1 $H_2:N_2$ molar ratio) using conventional techniques (i.e., over Fe-catalyst at 600° to 1000° F.). Waste gases are withdrawn via conduit 142 to purge methane and argon impurities introduced into zone 140, and product $NH_3$ is recovered via conduit 144. Excess heat in the ammonia synthesis section is removed by means of heat removal means 152 which can comprise heat exchangers, boilers, and the like.

The operations of $CO_2$ removal zone 110, methanation zone 120, compressor 130 and $NH_3$ synthesis zone 140 are conventional and need not be more completely described for a full understanding of the process of this invention. The precise operating parameters and equipment of each such process step, therefore, will be readily apparent to one having ordinary skill in the art, and each step can include the usual internal recycle streams and stages found useful in the prior art. Thus, $CO_2$-removal zone 110 can include conventional $CO_2$-absorbtion and $CO_2$ desorption stages wherein the $CO_2$-laden gas 103 is contacted with a liquid containing either a solvent for, or a dissolved compound (e.g., $K_2CO_3$) readily reactive with, the $CO_2$; the $CO_2$-free gases (generally containing less than about 0.3 vol. % $CO_2$) are withdrawn; and the solvent is treated to desorb the $CO_2$ gases 111 for recycle of solvent to the absorber. Zone 110 can also employ conventional pressure swing adsorption methods for $CO_2$ removal. Exemplary of suitable conventional $CO_2$ removal systems are those discussed in Kirk-Othmer, *Encyclopedia of Chemical Technology*, 3d ed., vol. 2, pp. 492–494 (1978). Similarly, methanator 120 will generally employ a temperature in the range of about 500° to 900° F., a pressure from about 300 to 1000 psig, and a supported Ni catalyst (e.g., Ni on alumina) to convert any remaining CO and $CO_2$ in gas stream 112 to methane, thereby producing an effluent gas 124 containing less than about 10 vppm (i.e., parts per million by volume) of total CO and $CO_2$, and $H_2$ and $N_2$ in a $H_2:N_2$ molar ratio of from about 2.6:1 to 3.2:1. Compression in zone 130 can take place in several stages, as desired, to bring the methanator effluent to synthesis reactor pressure, which generally ranges from about 1500 to 5000 psig. (If desired, compressors 130 can be located upstream of zone 110, to compress the gas prior to treatment in zone 110.) Finally, ammonia synthesis zone 140 can include conventional dryer units wherein trace water is removed from the syn gas as required and conventional purge recovery units wherein a portion or all of the gas effluent from the ammonia synthesis reactor is treated to recover and recycle $H_2$ to the reactor and to remove inerts such as $CH_4$ and Ar therefrom. (If desired, such conventional dryer units can instead be located prior to or at an intermediate point within gas compression stage zone 130.)

The improved process of this invention produces a syn gas 126, having a $H_2:N_2$ molar ratio of about 3:1, that is a $H_2:N_2$ molar ratio of from about 2.6:1 to 3.2:1, and which has a residual methane concentration (dry basis) of less than about 3 vol. %, and more typically less than about 2 vol. %, and which is therefore particularly suitable for direct feed to an ammonia synthesis reactor zone 140, that is a syn gas 126 which is not subjected to a cryogenic purification following methanator 120 to remove excess nitrogen and/or methane prior to the ammonia synthesis reaction. If desired, syn gas 126 can be subjected to a cryogenic purification prior to introduction into ammonia synthesis reactor zone 140, for example by use of the cryogenic purification method of U.S. Pat. No. 3,442,613, the disclosure of which is hereby incorporated by reference.

Figure 3:
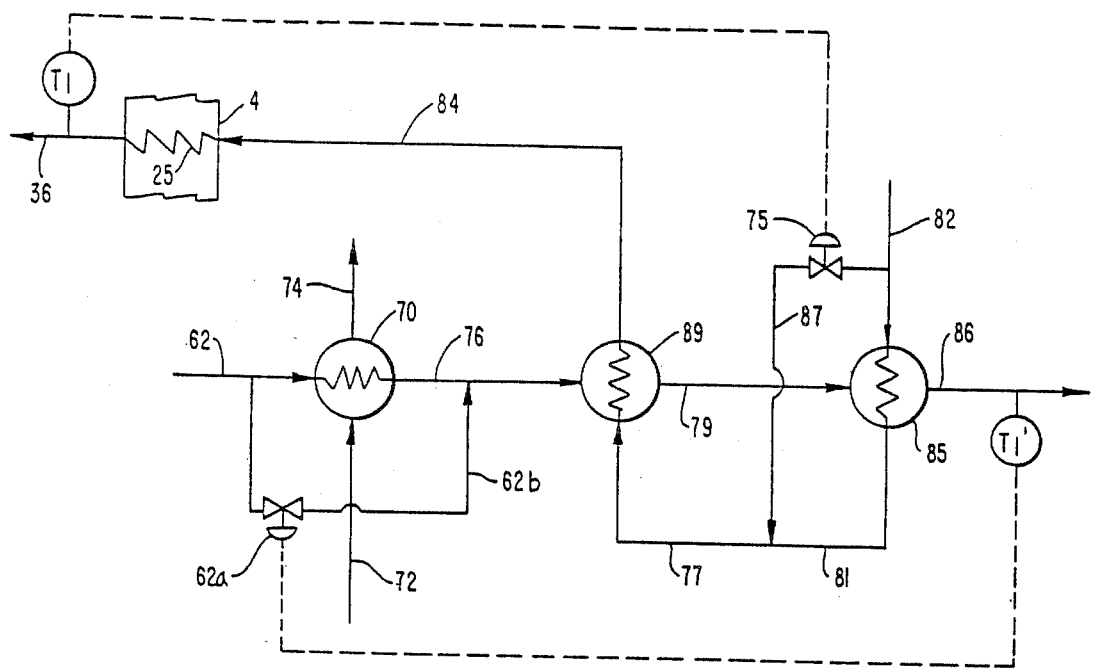
FIG. 3 is a diagrammatic illustration of a portion of the process of FIG. 1 showing a method for controlled generation of superheated steam from secondary reformer effluent waste heat.

In FIG. 3, there is illustrated a preferred method for generating superheated steam by recovery of waste heat from the secondary reformer effluent 62, which is produced as illustrated in FIG. 1. In the embodiment of FIG. 3, a secondary reformer effluent 62 is first passed to saturated steam generator 70 for generation of saturated high pressure steam 74 from preheated water stream 72. The partially cooled secondary reformer effluent 76 is withdrawn from boiler 70 and passed to first series steam superheater 89 for generation of superheated steam 84 which is passed to convection section superheater 25 as described above. In this embodiment, the high pressure steam passed to superheat exchanger 89 is steam 77, which is produced from high pressure saturated steam 82 in second heat exchanger 85 to form a further heated steam 81, which is then combined with any by-pass steam flowing through valve 75 to conduit 87 and passed via conduit 77 to the first exchanger 89. The heating medium for second exchanger 85 comprises the further cooled secondary reformer effluent 79 which is withdrawn from first superheat exchanger 89. There is thus formed the desired secondary reformer effluent stream 86 which can then be passed to shift conversion or boiler as described above. In the embodiment of FIG. 3, the position of valve 75 in by-pass conduit 87 is controlled to achieve the desired temperature "$T_1$" in superheated steam 36 leaving superheater 25, which is positioned in convection section 4, as described above. A second by-pass conduit, conduit 62b around steam generator 70, is provided having a control valve 62a, the position of which is controlled to achieve the desired temperature "T₁'" in the cooled secondary effluent stream 86 leaving steam superheat exchanger 85. Such feedback control valves 75 and 62a permit lower metal temperatures in exchanger 89 and thereby allow use of lower cost metallurgy and/or provide longer exchanger service life. Therefore, in FIG. 3, the first steam superheating zone comprises a series of two superheaters 89 and 85.

The preferred split of superheat duty between secondary reformer effluent superheat exchanger(s) 80 and the convection section superheater 25 depends on the overall plant steam and heat balance.

Preferably, the amount of steam superheating done in the secondary reformer effluent superheat exchanger(s) 80 should be just enough to eliminate the need for auxiliary firing in the reformer furnace convection section (i.e., set so that total superheating duty can be supplied without auxiliary firing) yet not so great as to require installation of a convection section boiler to fully recover available convection section waste heat.

Figure 4:
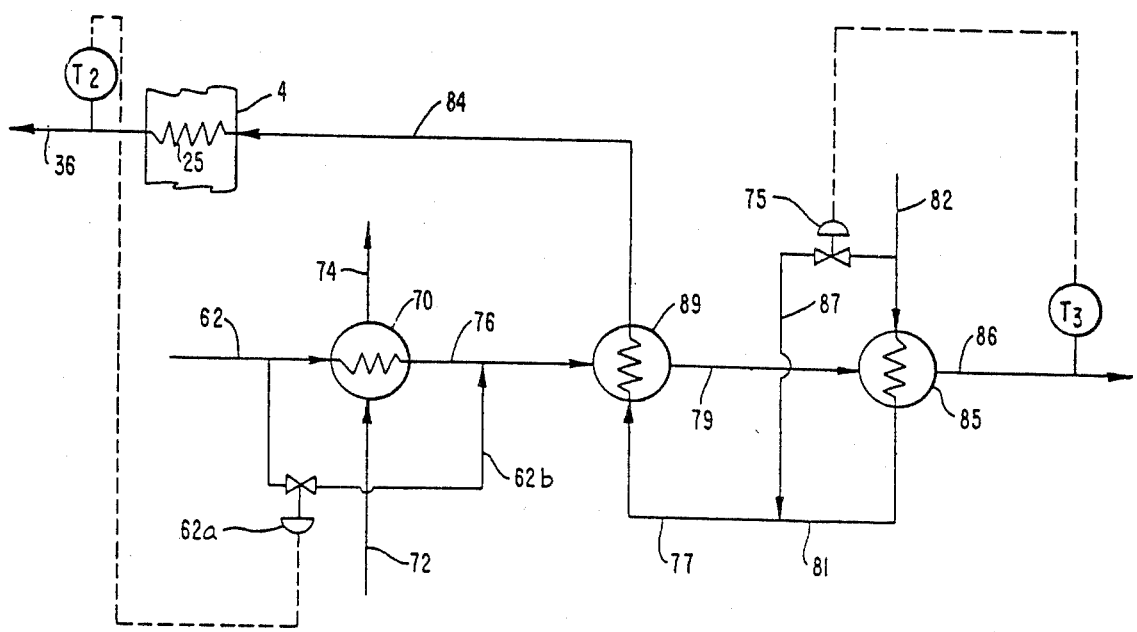
FIG. 4 is a diagrammatic illustration of a portion of the process of FIG. 1 in which yet another method is used for controlled generation of superheated steam from secondary reformer effluent waste heat.

Referring to FIG. 4, the embodiment of FIG. 3 is illustrated wherein the position of valve 75 in bypass conduit 87 is controlled to achieve the desired temperature "T₃" in gas stream 86, which comprises the feedstream to high temperature shift zone 90. The sensed temperature "T₂" of superheated steam 36 leaving convection section superheater 25 is employed to control the position of valve 62a in by-pass line 62b which is provided about steam generator 70 to control the amount of secondary reformer effluent 62 which is passed to generator 70.

Figure 5:
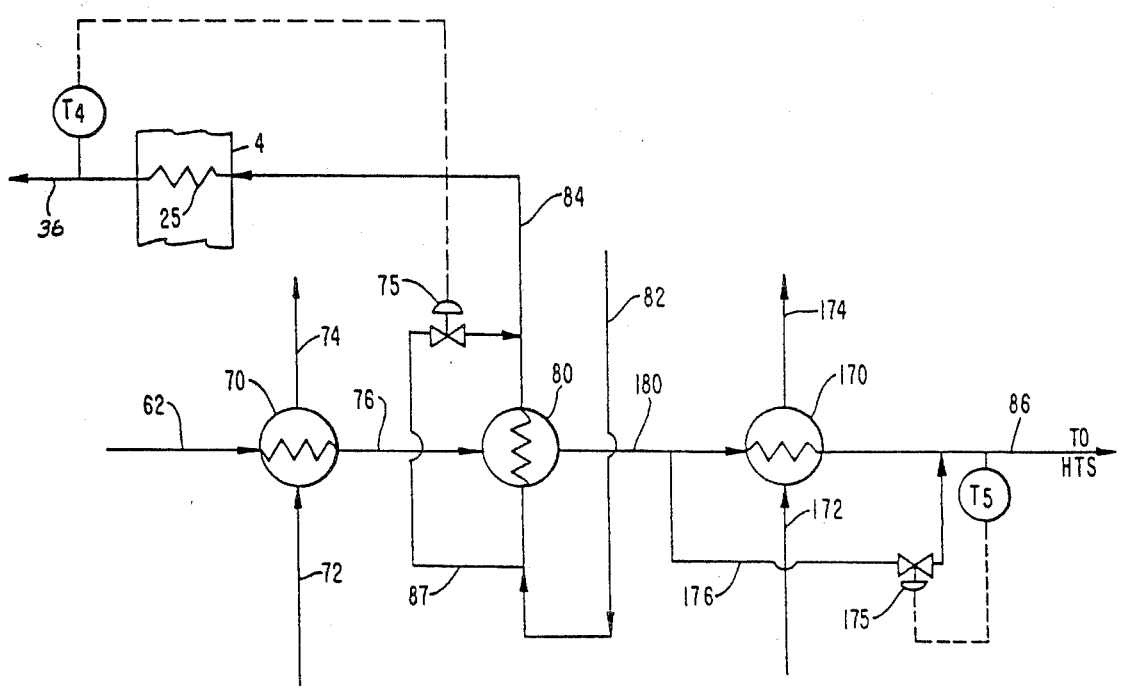
FIG. 5 is a diagrammatic illustration of a portion of the process of FIG. 1 in which still another method is used for controlled generation of superheated steam from secondary reformer effluent waste heat.

Referring now to FIG. 5, secondary reformer effluent 62 is passed to saturated steam generator 70 for generation of saturated high pressure steam 74 from preheated water stream 72. The partially cooled secondary reformer effluent 76 is withdrawn from boiler 70 and passed to steam superheater 80 for generation of superheated steam 84 which is passed to convection section superheater 25 as described above. A by-pass line 87 is provided about exchanger 80 and is provided with valve 75, whose position is controlled to achieve the desired temperature "T₄" of superheated steam 36, in order to control the amount of saturated high pressure steam 82 which is passed to superheater 80. (Superheater 80 can of course be optionally further split into two exchangers in series with steam by-pass and control means arranged as illustrated in FIG. 3). There is thus formed a partially cooled secondary reformer effluent stream 180 which can then be passed to a second saturated steam generator 170 for generation of additional saturated high pressure steam 174 from preheated water stream 172, and to form a further cooled secondary reformer effluent stream 86 which can be passed to shift conversion zone 90 as described above. By-pass line 176, which is provided with valve 175, is preferably provided about the second boiler 170 to control the amount of secondary reformer effluent which is passed to boiler 170. Preferably, valve 175 is controlled to achieve the desired temperature "T₅" which is sensed in stream 86.

The improved process of this invention can be further illustrated by reference to the following examples.

EXAMPLE 1

Figure 2:
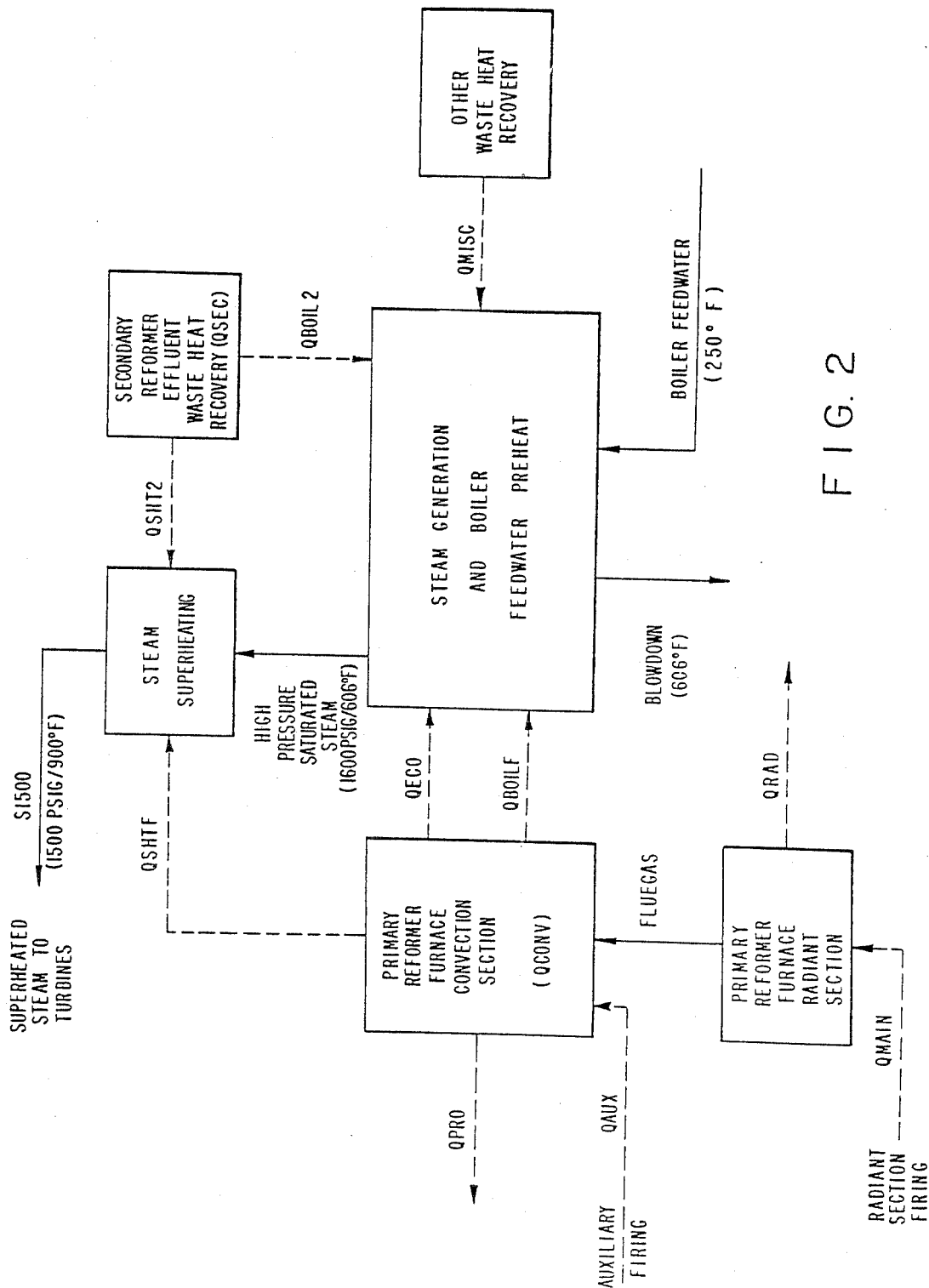
FIG. 2 is a diagrammatic illustration of the high pressure steam and heat recovery system of an integrated hydrocarbon steam reforming process, as described in Example 1.

To compare the improvements achieved by the process of this invention, the following cases have been studied, referring to the simplified ammonia plant high pressure steam and heat system schematic illustrated in FIG. 2. The terms employed in FIG. 2 are defined as set forth in Table 1 below.

TABLE 1

| Item | Description |
|---|---|
| | Definition of Terms in FIG. 2 |
| QAUX | Primary reformer furnace convection section auxiliary burner firing rate. |
| QBOILF | Primary reformer convection section boiler heat duty. |
| QBOIL2 | Secondary reformer effluent waste heat boiler 70 heat duty. |
| QCONV | Total reformer furnace convection section 4 heat duty. |
| QECO | Primary reformer furnace convection section economizer (BFW[1] preheater 22) heat duty. |
| QMAIN | Primary reformer furnace radiant section burner (14 + 16 combustion) firing rate. |
| QMISC | Miscellaneous waste heat available (from HTS, LTS and ammonia synthesis reactor effluents) for steam generation and BFW[1] preheat. |
| QPRO | Primary reformer furnace convection section process preheat duty[2]. |
| QRAD | Primary reformer radiant heat absorbed by catalyst tubes 56. |
| QSEC | Total waste heat available between secondary reformer outlet 62 and high temperature shift converter 80 inlet 86. |
| QSHTF | Primary reformer furnace convection section superheater 25 heat duty. |
| QSHT2 | Secondary reformer effluent superheater 80 heat duty. |
| S1500 | Total 1500 psig/900° F. superheated steam production (conduit 36). |

Notes:
[1] Boiler feedwater.
[2] Sum of feed gas exchanger 24, process steam exchanger 21 and process air exchanger 26 heat duties.

(Also, in FIG. 2, the term "blowdown" is intended to refer to the small amount of water conventionally purged from boilers to avoid excessive buildup of trace non-volatile impurities entering the boiler with the feed water. Auxiliary firing refers to conventional auxiliary burners employed in the convection section of the primary reforming furnace.)

In Case A, the process of this invention is illustrated employing the embodiment of FIG. 1 and using series steam superheaters 80 and 25 as described above to form an ammonia synthesis gas. In Case B, the embodiment of FIG. 1 is modified and all steam superheating is performed in the primary reformer furnace's convection section, and effluent waste heat is used only for generation of saturated steam (i.e., no steam superheater 80 is used). In Case C, FIG. 1 is modified such that all steam superheating is performed using secondary reformer effluent waste heat, and no convection section superheater 25 is used. In Case D, a conventional convection section boiler is provided in the primary reformer of Case C.

Referring to Table 2, the series superheaters arrangement of Case A can be compared with the most conventional approach in Case B of doing all superheating in the reformer furnace convection section, and using secondary reformer effluent waste heat only for saturated steam production. The series superheaters Case A adjusts the heat duty split between the two superheaters to yield a total reformer furnace convection section duty (QCONV=176.1 MBtu/hr) that uses all the heat available (for these Examples, down to a target stack temperature of 320° F.) in the flue gas leaving the reformer radiant section, but does not require any auxiliary fuel firing in the convection section. The conventional Case B (same radiant section reformer firing and heat duty as Case A) does not have the flexibility of the series superheater approach, and produces a great deal of extra steam in the secondary reformer effluent waste heat boiler (QBOIL2 rises to 180.6 MBtu/hr in Case B from 99.7 MBtu/hr in Case A). This requires more boiler feedwater which raises the convection section boiler feedwater preheat duty (QECO is 106.4 MBtu/hr vs. 66.9 MBtu/hr). The increased steam production also boosts the total superheating duty substantially (QSHTF plus QSHT2 is 122.7 MBtu/hr vs. 92.0 MBtu/hr in Case A). Combining these effects, one sees a steam production (S1500) increase in Case B of 116419 lb/hr, at the expense of a convection heat duty jump of 151.1 MBtu/hr. Assuming a 90% efficiency of the primary reformer furnace, this requires auxiliary fuel firing (QAUX) of 167.9 MBtu(LHV)/hr, which corresponds to 4.0 MBtu(LHV)/MeT NH$_3$. Unless a highly efficient use could be found for the incremental steam production, a huge energy penalty would be incurred.

Cases C and D illustrate the opposite situation to Case B, with all superheating being done with secondary reformer effluent waste heat (no convection section superheater). In Case C, there is no steam generation in the primary reformer furnace convection section. Case D adds a conventional boiler to Case C for steam generation in the convection section.

In Case C, without a convection section boiler, total steam production goes down to 337,464 lb/hr, because more of the secondary reformer effluent waste heat must go for superheating, and correspondingly less is available for steam generation. Economizer duty also falls in Case C, because less boiler feedwater must be preheated. Overall, the total convection section duty drops (no superheating and smaller economizer duty) to 161.1 MBtu/hr. Since the "natural" heat available in the convection section flue gas without auxiliary firing (i.e., the heat available from cooling the flue gas to the 320° F. target stack temperature) is 176.2 MBtu/hr, 15.1 MBtu/hr is wasted up the stack. If this must be made up in a 90% efficient offsite boiler, the extra firing requirement would be 16.8 MBtu(LHV)/hr, which corresponds to 0.4 MBtu(LHV)/MeT NH$_3$.

If a convection section boiler is provided as in Case D, the secondary reformer effluent steam generation lost when doing all the superheating with secondary reformer effluent can be made up in the reformer furnace convection section. One can then end up with an identical overall energy balance to the series superheaters Case A. As can be seen from Table 2, total convection section duties (QCONV) and total steam generations (S1500) are the same. In this situation, the advantage for the series superheaters concept lies not in energy credits or increased steam production flexibility, but rather in simplifying the process arrangement. With a convection section boiler, a forced boiler water circulation system is normally required. This adds the investment, operating cost and reliability debits of having boiler-water circulating pumps. Conversely, without a convection section boiler, as in the series superheaters concept, a simpler natural boiler water circulation system normally can be used, eliminating the need for boiler-water circulating pumps.

Overall, the use of series superheaters 80 and 25 according to the process of this invention offers substantial advantages over conventional ammonia plant arrangements, especially for low energy designs with limited steam export potential, and particularly for designs employing low severity reforming, wherein the secondary reformer effluent possesses greater than about 0.8 vol. % methane (dry basis).

TABLE 2

| | | Energy Effects of Superheating Alternatives[1] | | | |
|---|---|---|---|---|---|
| | | Case A | Case B | Case C | Case D |
| | | Series | Only 1° Reformer | Only Secondary Reformer Superheater With | |
| Item | Units | Superheaters | Superheater[2] | No 1° Reformer Boiler | 1° Reformer Boiler |
| QMISC | MBtu/hr | 194.6 | 194.6 | 194.6 | 194.6 |
| QPRO | MBtu/hr | 98.2 | 98.2 | 98.2 | 98.2 |
| QSEC | MBtu/hr | 180.6 | 180.6 | 180.6 | 180.6 |
| QBOILF | MBtu/hr | — | — | — | 11.1 |
| QBOIL2 | MBtu/hr | 99.7 | 180.6 | 91.7 | 88.6 |
| QECO | MBtu/hr | 66.9 | 106.4 | 62.9 | 66.9 |
| QSHTF | MBtu/hr | 11.1 | 122.7 | — | — |
| QSHT2 | MBtu/hr | 80.9 | — | 88.9 | 92.0 |
| QCONV | MBtu/hr | 176.2 | 327.3 | 161.1[3] | 176.2 |
| QAUX[4] | MBtu(LHV)/hr | — | 167.9[5] | — | — |
| S1500 | lb/hr | 349002 | 465421 | 337464 | 349002 |

Notes:
[1]Reformer radiant firing (QMAIN) and heat absorbed (QRAD) equal for all cases. Basis is steam balance for a 1000 MeT/SD (metric ton per on-stream day) ammonia plant.
[2]Assumes no shield boiler is required to protect convection section from auxiliary burner radiation (otherwise QBOILF is not zero and QAUX and S1500 rise even further). Also assumes economizer duty must rise (maintaining same boiler feedwater preheat temperature) to avoid heat transfer pinch in convection section.
[3]If lost convection section waste heat recovery must be made up via a 90% efficient boiler, the extra fuel requirement would be 16.8 MBtu(LHV)/hr, equivalent to 0.40 MBtu(LHV)/MeTNH$_3$. (MBtu = million Btu; LHV = lower heating value.)
[4]Assumes 90% convection section heat recovery from auxiliary firing (1° reformer).
[5]Equivalent to 4.03 MBtu(LHV)/MeT NH$_3$.

EXAMPLE 2

To provide further evidence of the process improvements achieved by this invention, the following additional cases have been studied, again referring to the simplified ammonia plant high pressure steam and heat systems schematic illustrated in FIG. 2 and employing the identified terms of Table 1 above.

Case A represents the process of this invention as described in Example 1. In Case A, no superheating of steam is accomplished in heat recovery zone 152 in ammonia synthesis converter zone 140. In Case E, the process of FIG. 1 is modified by superheating steam in converter synthesis zone 140, e.g., in a steam superheating exchanger 152 in indirect heat exchange with the ammonia reactor effluent gas, and then further superheating in a second superheater 25 provided in the convection section of the primary reformer as in FIG. 1. ("QSHTC" in Table 3 refers to the heat duty in the superheater provided in ammonia synthesis converter zone 140 to recover heat from the effluent of the ammonia synthesis reactor.) Therefore, in Case E, superheated steam is not produced by recovery of heat from the secondary reformer effluent. The process of FIG. 1 is modified in Case F in that the convection section of the primary reformer is not provided with either a superheater exchanger or a boiler in order to generate steam, and all steam superheating is accomplished by means of a superheater 152 positioned at the effluent of the ammonia synthesis reactor and a second superheater 80 in the secondary reformer effluent. Case G represents the modification to Case F, wherein a boiler is also provided in the primary reformer convection section. Finally, in Case H, the process of Case F is modified by the addition of a superheater 25 in the primary reformer convection section.

Referring to Table 3, the series superheaters arrangement of Case A can be compared with Case E, which employs a superheater in ammonia synthesis converter zone 140 and a superheater in the primary reformer convection section, but not a secondary reformer effluent superheater. For Case E to yield an equivalent steam and energy balance to Case A, the ammonia synthesis converter zone superheater duty, QSHTC, should be able to fully substitute for the secondary reformer effluent superheater duty, QSHT2, in Case A. However, the temperature of the ammonia synthesis reactor effluent is much lower than that of secondary reformer effluent, even after secondary reformer effluent has been partially cooled in a boiler as in Case A. Accordingly, it may not be possible to achieve a sufficiently high superheated steam temperature in an ammonia reactor effluent superheater to provide the desired heat duty. In the example illustrated by Case E, the ammonia synthesis converter effluent temperature is 832° F., and the maximum steam superheat temperature achievable in a heat exchanger using converter effluent as a heat source was assumed to be 782° F., in order to provide a 50° F. driving force for heat transfer. With a steam outlet temperature limited to 782° F., the ammonia reactor effluent superheater duty (QSHTC) was limited to 67.8 MBtu/hr, as compared to 80.9 MBtu/hr for QSHT2 in Case A. This leaves Case E with a shortage of steam superheating capability and a surplus of steam generating capability. To bring Case E back into balance, it is therefore necessary to provide auxiliary firing in the reformer furnace convection section to supply additional superheating duty. The net effect is that total steam generation (S1500) goes up from 349,002 in Case A to 367,996 in Case E, at the expense of 27.4 MBtu/hr of auxiliary firing (QAUX) in Case E (assuming 90 percent primary reformer furnace efficiency), which corresponds to 0.7 MBtu (LHV)/MeT $NH_3$. Unless a highly efficient use could be found for the incremental steam production, a large energy penalty would thus be incurred. Moreover, the ammonia synthesis reactor effluent superheater employed in Case E must of necessity utilize an expensive high pressure shell mechanical design because both fluids are at a high pressure, so that no matter which one is passed through the shell side of the heat exchanger, the shell sees a high pressure.

Cases F–H illustrate the effect of using a secondary reformer effluent superheater plus an ammonia synthesis converter effluent superheater. Case F does not however include a primary reformer convection section boiler or superheater. Its overall energy and steam balance is equivalent to that of Case C, because without either a boiler or a superheater in the reformer convection section, the total convection section heat available (down to 320° F. stack temperature) cannot be utilized. If the lost convection section heat recovery must be made up in a 90 percent efficient off-site boiler, the extra firing requirement would be 16.8 MBtu(LHV)/hr, which corresponds to 0.4 MBtu (LHV)/MeT $NH_3$. Moreover, as with Case E, the ammonia synthesis reactor effluent superheater employed must in necessity utilize an expensive high pressure shell mechanical design because both fluids are at high pressure and therefore the shell side will be exposed to a high pressure no matter which fluid is passed through the shell side of the heat exchanger. Note that the same overall Case F heat and steam balance can be produced over a fairly broad range of values for QMISC, QBOIL2, QSHT2 and QSHTC. Notes (9), (10), (11) and (14) define the allowable ranges for the variables. If, for example, QSHTC were set to zero, Case F would reduce to Case C. If, at the other extreme, QSHTC was set to its maximum value of 62.2 MBtu/hr (50° F. driving force in converter effluent superheater), QMISC would be 132.4 MBtu/hr per Note (9), QSHT2 would be 26.7 MBtu/hr per Note (11), and QBOIL2 would be 153.9 MEtu/hr per Note (10). Obviously, any intermediate value of QSHTC could also be used, with corresponding QMISC, QSHT2 and QBOIL2 values calculated. Since the overall steam and energy balance would be unchanged, the optimum value of QSHTC could be selected so as to minimize investment requirements using conventional means for determining that optimum point.

Case G utilizes an ammonia synthesis reactor effluent superheater, a secondary reformer effluent superheater and a primary reformer convection section boiler. It yields the same overall heat and steam balance as does the series superheaters Case A, and is actually quite analogous to Case D. The advantage of Case A vs. Case G is therefore not in terms of energy credits or increased steam production flexibility, but rather in simplifying the process arrangement. Cases A and G each employ two power steam superheaters, but Case G additionally employs a primary reformer convection section boiler. In addition to that representing an extra piece of heat exchange equipment, a convection section boiler normally requires a forced boiler water circulation system, which adds the investment, operating costs and reliability debits of having boiler water circulating pumps. Conversely, without a convection section boiler, a simpler natural boiler water circulation system normally can be used. Another disadvantage of Case G is that, as with Cases E and F, the ammonia synthesis reactor effluent superheater employed must of necessity utilize an expensive high pressure shell mechanical design because both fluids are at high pressure, so that no matter which one is passed through the shell side of the heat exchanger, the shell sees a high pressure. The overall energy and steam balance illustrated for Case G can be achieved while using a range of heat duties for QMISC, QBOIL2, QSHT2 and QSHTC, as described in Table 3 Notes (9), (10), (12) and (15). If QSHTC is set at zero (i.e., eliminating ammonia synthesis reactor effluent superheater), Case G reduces to Case D. At the per Note (13) and QBOIL2 would be 164.0 MBtu/hr per Note (10). Any intermediate value of QSHTC is feasible, with the optimum value determinable by conventional means in order to minimize investment.

TABLE 3

| | | Energy Effects of Superheating Alternatives[6] | | | | |
|---|---|---|---|---|---|---|
| Item | Units | Case A Series Superheaters | Case E No Secondary Reformer Effluent Superheater | Case F No Primary Reformer Boiler or Superheater | Case G With Primary Reformer Boiler | Case H With Primary Reformer Superheater |
| QMISC | MBtu/hr | 194.6 | 126.8 | (9) | (9) | (9) |
| QPRO | MBtu/hr | 98.2 | 98.2 | 98.2 | 98.2 | 98.2 |
| QSEC | MBtu/hr | 180.6 | 180.6 | 180.6 | 180.6 | 180.6 |
| QBOILF | MBtu/hr | — | — | — | 11.1 | — |
| QBOIL2 | MBtu/hr | 99.7 | 180.6 | (10) | (10) | (10) |
| QECO | MBtu/hr | 66.9 | 73.3 | 62.9 | 66.9 | 66.9 |
| QSHTF | MBtu/hr | 11.1 | 29.3 | — | — | 11.1 |
| QSHT2 | MBtu/hr | 80.9 | — | (10)(11) | (10)(12) | (10)(13) |
| QCONV | MBtu/hr | 176.2 | 200.8 | 161.1[3] | 176.2 | 176.2 |
| QAUX | MBtu/hr | — | 27.4[7] | — | — | — |
| S1500 | lb/hr | 349002 | 367996 | 337464 | 349002 | 349002 |
| QSHTC | MBtu/hr | — | 67.8[8] | (9)(11)(14) | (9)(12)(15) | (9)(13)(15) |

Notes:
[3]If lost convection section waste heat recovery must be made up via a 90% efficient boiler, the extra fuel requirement would be 16.8 MBtu(LHV)/hr, equivalent to 0.40 MBtu(LHV)/MeT $NH_3$. (MBtu = million Btu; LHV = lower heating value.)
[6]Cases E-H employ a steam superheat exchanger to recover heat from the ammonia reactor effluent. Cases F-H also employ a secondary reformer effluent superheater.
[7]Equivalent to 0.66 MBtu(LHV)/MeT $NH_3$.
[8]Heat transfer limited by need to provide 50° F. hot end temperature driving force in converter effluent superheater (832° F. converter outlet and 782° F. superheater outlet).
[9]QMISC + QSHTC = 194.6
[10]QBOIL2 + QSHT2 = 180.6
[11]QSHT2 + QSHTC = 88.9
[12]QSHT2 + QSHTC = 92.0
[13]QSHT2 + QSHTC = 80.9
[14]QSHTC cannot exceed 62.2, if a minimum 50° F. driving force is desired in the converter effluent superheater.
[15]QSHTC cannot exceed 64.3, if a minimum 50° F. driving force is desired in the converter effluent superheater.

other extreme, if QSHTC is set at a maximum value of 64.3 MBtu/hr (50° F. driving force in converter effluent superheater), QMISC is then 130.3 MBtu/hr per Note (9), QSHT2 is 27.7 MBtu/hr per Note (12) and QBOIL2 is 152.9 MBtu/hr per Note (10). Regardless of the QSHTC duty chosen, QBOILF is 11.1 MBtu/hr and QECO is 66.9 MBtu/hr, the same values as in Case D. As with Case F, the specific value of QSHTC chosen can be set by a conventional optimization of investment cost.

Case H employs an ammonia synthesis reactor effluent superheater, a secondary reformer effluent superheater and a primary reformer convection section superheater, but no convection section boiler. It yields the same overall energy and steam balance as does the Case A series superheater arrangement. Therefore, the advantage of a series superheaters concept over the Case H arrangement lies not in energy credits or increased steam production flexibility but rather in simplifying the process arrangement. Case A requires one less superheater than Case H. Moreover, the ammonia synthesis reactor effluent superheater employed in Case H must of necessity utilize an expensive high pressure shell mechanical design because both fluids are at high pressure, so that no matter which one is passed through the shell side of the heat exchanger, the shell sees a high pressure. Case H gives the identical overall energy and steam balance over a range of heat duties for QMISC, QBOIL2, QSHT2 and QSHTC, as limited by the relationships described in Notes (9), (10), (13) and (15). If QSHTC is set at zero, Case H reduces to the Case A series superheaters arrangement (i.e., ammonia synthesis reactor effluent superheater is eliminated). At the other extreme, if QSHTC is set at its maximum value of 64.3 MBtu/hr (to provide the minimum 50° F. heat transfer driving force), QMISC would be 130.3 MBtu/hr per Note (9), QSHT2 would be 16.6 MBtu/hr While the process of this invention has been described above in relation to production of ammonia synthesis gas, containing mixtures of hydrogen and nitrogen suitable for feed to an ammonia synthesis reactor for formation of ammonia, it will also be understood that the process of this invention is also suitable for formation of hydrogen-enriched gases, and that the foregoing description can be modified by substituting a nitrogen-depleted or nitrogen-free oxygen-containing gas for the process air 32. Thus, oxygen-enriched gas can be passed via conduit 32 to exchanger 26 for preheating for introduction into secondary reformer 60 by means of conduit 34, to provide the oxygen requirements for the secondary reforming reaction and to produce a secondary reformer effluent 62 which is enriched in hydrogen and which can then be treated as described above for generation of superheated steam and subjected to the conventional steps of high temperature shift and low temperature shift conversion, carbon oxide removal and drying or other conventional purification steps, such as pressure swing adsorption, to form the desired hydrogen-enriched gas, which will generally contain hydrogen in an amount of from about 60 to 100 vol. % on a dry basis. Any of the above-discussed feed gas streams 6 which are reformable can be used as a feed, and the process conditions described above are equally suitable.

Thus, while I have illustrated and described the preferred embodiment of my invention, and have described my invention and the manner and process of making and using it in such full, clear, concise and exact terms as to enable any person skilled in the art to which it pertains to make and use the same, one skilled in the art can easily ascertain the esssential characterisrics of this invention and without department from the spirit and

What is claimed is:

1. In a process for steam reforming of a hydrocarbon gas feedstream wherein:
   (a) the hydrocarbon gas feedstream is partially reformed at elevated temperatures in indirect heat exchange with hot combustion gases in a direct fired primary reforming furnace provided with a convection section for recovery of excess heat from said combustion gases; and (b) the partially reformed feedstream is then further reformed in the presence of an oxygen-containing gas and steam in a secondary reformer to form a secondary reformer gaseous effluent the improvement which comprises recovering waste heat from said secondary reformer effluent gas and from said primary reforming combustion products by (i) heating a high pressure saturated steam in a first steam superheating zone by indirect heat exchange with at least a portion of said secondary reformer effluent gas to form a first superheated steam stream; and (ii) further heating said first superheated steam in a second steam superheating zone by indirect heat exchange with at least a portion of said primary reformer hot combustion gases to form a second superheated steam stream.

2. The improved process of claim 1 wherein said first stream of superheated steam withdrawn from said first superheating zone is characterized by a temperature of from about 500° to 950° F.

3. The improved process of claim 1 wherein the superheated steam formed in said second superheating zone is characterized by a temperature of about 600° to 1050° F.

4. The improved process of claim 1 wherein said secondary reformer gaseous effluent is first passed to a steam boiler for generation of high pressure saturated steam, thereby forming a partially cooled secondary reformer gaseous effluent and wherein said partially cooled secondary reformer gaseous effluent is passed to said first superheating zone for generation of said first stream of superheated steam.

5. The improved process of claim 4 wherein said partially cooled secondary gaseous effluent is characterized by a temperature of from about 850° to 1500° F.

6. The improved process according to claim 4 wherein at least a portion of the high pressure saturated steam passed to said first superheating zone is generated in a second steam boiler by indirect heat exchange with the secondary reformer gaseous effluent which is withdrawn from said first superheating zone.

7. The improved process of claim 1 wherein said secondary reformer effluent gas is treated to recover waste heat therefrom by (i) passing said secondary reformer gaseous effluent to a steam boiler for generation of high pressure saturated steam, to form a partially cooled secondary reformer gaseous effluent; (ii) passing said partially cooled secondary reformer gaseous effluent to a first steam superheat exchanger for generation of said first stream of superheated steam to form a further cooled secondary reformer gaseous effluent; and (iii) passing said further cooled secondary reformer gaseous effluent to a second steam superheater exchanger for still further cooling of said reformer effluent, said second steam superheat exchanger receiving high pressure saturated steam and forming superheated steam therein for feed of said superheated steam to first steam superheater exchanger, said second steam superheat exchanger being provided with by-pass control means for controlling the quantity of said high pressure saturated steam which is passed through said second superheat exchanger.

8. The improved process according to claim 7 wherein said by-pass control means are controlled in response to the temperature of said second superheated steam stream.

9. The improved process according to claim 7 wherein said by-pass control means are controlled in response to the temperature of said still further cooled secondary reformer effluent gas which is withdrawn from said second steam superheat exchanger.

10. The improved process according to claim 1 wherein said second superheated steam stream is passed to steam turbines for recovery of work therefrom and wherein at least a portion of the steam discharged from said turbines is passed to step (a) of the process for said partial reforming of the hydrocarbon gas feedstream.

11. The improved process of claim 10 wherein at least a portion of steam discharged from said turbines is further heated in said convection section prior to being passed to said step (a) for use in partial reforming of the hydrocarbon gas feedstream.

12. In a process for forming an ammonia synthesis gas by steam reforming of a hydrocarbon gas feedstream wherein: (a) the hydrocarbon gas feedstream is partially reformed at elevated temperatures in indirect heat exchange with hot combustion gases in a direct fired primary reforming furnace provided with a convection section for recovery of excess heat from said combustion gases; (b) the partially reformed feedstream is then further reformed in the presence of air and steam in a secondary reformer to form a secondary reformer gaseous effluent; and (c) said secondary reformer gaseous effluent is subjected to shift conversion, carbon oxides removal and methanation to form an ammonia synthesis gas, the improvement which comprises recovering waste heat from said secondary reformer effluent gas and from said primary reforming combustion products by (i) heating a high pressure saturated steam in a first steam superheating zone by indirect heat exchange with at least a portion of said secondary reformer effluent gas to form a first superheated steam stream; and (ii) further heating said first superheated steam in a second steam superheating zone by indirect heat exchange with at least a portion of said primary reformer hot combustion gases to form a second superheated steam stream.

13. The improved process of claim 12 wherein said secondary reformer gaseous effluent is first passed to a steam boiler for generation of high pressure saturated steam, thereby forming a partially cooled secondary reformer gaseous effluent and wherein said partially cooled secondary reformer gaseous effluent is passed to said first superheating zone for generation of said first stream of superheated steam.

14. The improved process according to claim 12 wherein at least a portion of the high pressure saturated steam passed to said first superheating zone is generated in a second steam boiler by indirect heat exchange with the secondary reformer gaseous effluent which is withdrawn from said first superheating zone.

* * * * *